United States Patent Office 3,590,082
Patented June 29, 1971

3,590,082
4-(p-FLUOROPHENYL)SALICYLAMIDE
DERIVATIVES
Lewis H. Sarett, Princeton, and William V. Ruyle, Scotch Plains, N.J., assignors to Merck & Co., Inc., Rahway, N.J.
No Drawing. Filed Oct. 6, 1967, Ser. No. 673,270
Int. Cl. C07c 103/30
U.S. Cl. 260—559         2 Claims

ABSTRACT OF THE DISCLOSURE

New fluorophenyl benzoic acid compounds particularly 5-(4'-fluorophenyl)-2-substituted benzoic acid derivatives and process for their preparation are claimed. The new fluorophenyl benzoic acid compounds described have anti-inflammatory, anti-pyretic and analgesic activity.

BACKGROUND OF THE INVENTION

The development of anti-inflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of much simpler structure and having less side effects.

SUMMARY OF THE INVENTION

This invention relates to new fluorophenyl benzoic acid compounds and processes for producing the same, particularly 5-(4'-fluorophenyl)-2-substituted benzoic acid derivatives. These compounds are useful in that they have anti-inflammatory activity and are effective in the prevention and inhibition of edema and granuloma tissue formation. In addition, some of them have a useful degree of antipyretic and analgesic activity.

DESCRIPTION AND PREFERRED EMBODIMENTS

This invention relates to new fluorophenyl benzoic acid compounds and to processes for producing same. More specifically, this invention relates to substituted 5-(4'-fluorophenyl)benzoic acid derivatives. Still more specifically, this invention relates to compounds having the following general formula:

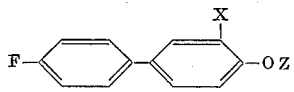

wherein:

X is nitrile, formyl, 5-tetrazolyl, amidino, 5-(2-hydroxy-1,3,4-oxadiazolyl) or the radical

wherein

Y is hydroxy, lower alkenyloxy (such as allyloxy, cinnamyloxy, 2-butenyloxy, methallyloxy);
lower alkynyloxy (such as propargyl, 2-butynyloxy, phenylpropargyl);
lower cycloalkoxy (such as cyclohexyloxy, cyclopentyloxy, cycloheptyloxy, cyclopropyloxy);
lower cycloalkoxy lower alkoxy (such as β-cyclohexyloxy-ethoxy, β-cyclopentyloxyethoxy);
polylower alkoxy lower alkoxy (such as β,γ-bis-ethoxypropoxy, β,γ-bis-propoxypropoxy, β,γ-bis-ethoxybutoxy);
phenyl amino (anilino);
substituted phenylamino wherein the substituents can be lower alkyl, lower alkoxy, anisidino, nitro and halo (such as p-toluidino and p-chloro phenylamino);
lower cycloalkylamino lower alkoxy (such as β-cyclohexylaminoethoxy, β-cyclopentylamino ethoxy); di-(hydroxy lower alkyl) amino (such as [di-(β-hydroxyethyl)amino], [di - (β - hydroxypropyl)amino]; phenyl lower alkylamino (such as benzylamino, phenethylamino);
lower cycloalkylamino (such as cyclohexylamino, cyclopentylamino, cyclopropylamino);
di-lower cycloalkylamino (such as di-cyclohexylamino);
1 - (4 - loweralkyl)piperazino (such as 1 - (4 - methyl)-piperazino);
N-piperidino, N-pyrollidino or a sugar or carbohydrate moiety (such as glucosyl, galactosyl, aminoglucosyl, sorbityl, sucrose, N-acetylglucosaminido or N-acetyl-galactoseaminido);
Z is hydrogen, lower alkanoyl (such as acetyl);
N-loweralkyl carbamido (such as N-ethyl carbamido, N-propyl carbamido);
halo lower alkanoyl (such as trifluoroacetyl, chloroacetyl, fluoroacetyl, dichloroacetyl);
lower alkoxy carbonyl (such as methoxy carbonyl, ethoxy carbonyl);
aryloxy carbonyl (such as benzyloxy carbonyl); aroyl (such as benzoyl or naphthoyl);
substituted benzoyl, said substituents preferably being halo, lower alkyl or lower alkoxy;
N,N-dilower alkyl carbamido alkyl (such as N,N-diethyl carbamido methyl, N,N-dipropyl carbamido methyl);
a carbohydrate or sugar moiety (such as a glycosyl radical, preferably N-acetylglucosaminido or N-acetylgalactoseaminido). However, Y and Z cannot be hydroxy and hydrogen repsectively at the same time.

Y and Z taken together can represent the following:

where R is lower alkyl, halo alkyl, phenyl and substituted phenyl such as halo phenyl, lower alkyl phenyl, and lower alkoxy phenyl;

wherein R₁ is phenyl or substituted phenyl such as halo phenyl, lower alkyl phenyl, and lower alkoxy phenyl;

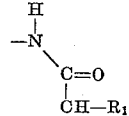

wherein R₁ is phenyl or substituted phenyl such as halo phenyl, lower alkyl phenyl and lower alkoxy phenyl.

Representative compounds of this invention are as follows:

2-benzoyloxy-5-(4'-fluorophenyl)-benzonitrile;
4-benzoyloxy-3-(5-tetrazolyl)-4'-fluorobiphenyl;
4-hydroxy-3-[5-(2-hydroxy-1,3,4-oxadiazolyl)]-4'-fluorobiphenyl;
allyl-2-hydroxy-5-(4'-fluorophenyl)-benzoate;
cyclohexyl-2-acetoxy-5-(4'-fluorophenyl)-benzoate;
2-hydroxy-5-(4'-fluorophenyl)-benzanilide;
N-[2-hydroxy-5-(4'-fluorophenyl)-benzoyl]-piperidine;
ethyl-6-O-[2'-acetoxy-5'-(4''-fluorophenyl)-benzoyl]-α-glucopyranoside;
2-(N-ethylcarbamoyloxy)-5-(p-fluorophenyl)-benzanilide;
2-trifluoroacetoxy-5-(4'-fluorophenyl)-benzoic acid;
2-(methoxycarbonyloxy)-5-(4'-fluorophenyl)-benzoic acid;

2-benzoyloxy-5-(4'-fluorophenyl)-benzoic acid;
2-benzoyloxy-5-(4'-fluorophenyl)-benzamide;
2-(N,N-diethyl carboxamido methoxy)-5-(4'-fluorophenyl)-benzoic acid;
2-(p-methoxy phenyl)-6-(p-fluorophenyl)-4-oxo-2,3-dihydrobenz-1,3-oxazine;
2-(β-chloroethyl)-6-(p-fluorophenyl)-4-oxo-2,3-dihydrobenz-1,3-oxazine;
6-(4'-fluorophenyl)-2-phenyl-1,3-benzoxazine-4-one;
[2-carboxy-4-(4'-fluorophenyl)phenyl]-2''-acetamido-2''-deoxyglucoside.

We have found that the compounds described above have anti-inflammatory activity and are effective in the prevention and inhibition of edema and granuloma tissue formation. In addition, some of them have a useful degree of anti-pyretic and analgesic activity. For these purposes they are normally administered orally in tablets or capsules, the optimum dosage depending on the particular compound being used and the type and severity of the condition being treated. Although the optimum quantities to be used will depend on the compound employed and the particular type of disease treated, oral dose levels of preferred compounds in the range of 50 mg. to 10 g. on the activity of the specific compound and the reaction sensitivity of the patient.

The compounds of this invention may be prepared from a biphenyl phenol or from an alkali metal salt of a 4'-fluoro biphenyl phenol. Some of these compounds are prepared from the individual phenol moieties of the above starting material by the well-known Gomberg reaction. However, all the starting materials used in this invention may be obtained by first preparing an aniline compound containing a fluorine atom followed by a Gomberg reaction with nitro benzene or anisole, subsequently reacting either the nitro group or the methoxy group (from nitro benzene or anisole) of the biphenyl compound there was prepared so as to obtain the alkali salt starting material.

The 4-(fluorophenyl)-phenol compounds described above may be converted to the corresponding alkali salt by any well known means, for example reaction with an appropriate alkali metal in an inert solvent.

The 2-hydroxy - 5 - (4'-fluorophenyl)-benzoic acid starting materials of this invention may be prepared from the previously prepared alkali phenylate or phenol compound. The preparation of this benzoic acid compound is carried out by using the well-known Kolbe-Schmidt carbonation procedure. In this carbonation step, the phenylate is reacted with phenyl dioxide or the phenol is reacted with carbon dioxide in the presence of an alkali carbonate such as potassium, sodium and the like carbonates, especially potassium carbonate at an elevated temperature (above 75° C., preferably above 100° C.) with or without a solvent, preferably without a solvent (or if a solvent is used, any high-boiling inert solvent may be used) until the reaction is substantially complete and subsequent acidification of the reaction mixture.

The alkyl ester, preferably the methyl ester of the 2-hydroxy - 5 - (4' - fluorophenyl)-benzoic acid described above is prepared by any esterification procedure using an esterfying agent containing the appropriate alkoxy group, for example, the benzoic acid compound described above may be reacted with the appropriate lower alkanol (preferably methanol) at elevated temperatures in the presence of a strong acid such as hydrogen chloride, sulfuric acid, p-toluenesulfonic acid and the like to form the desired ester compound.

The amide and hydrazide starting materials of this invention (Examples 1 and 3) may be prepared by any suitable amidation reaction. For example, the benzoic acid compound (preferably the methyl ester) may be reacted with ammonia, ammonium hydroxide or hydrazine at any suitable temperature (room temperature to reflux). When the amino group is desired, it is preferred to carry out the reaction with ammonia in a bomb at temperatures above 100° C. to form the desired 2-hydroxy-5-(4'-fluorophenyl)-benzamide. A similar type reaction using hydrazine in place of ammonia will give the corresponding benzhydrazide. The starting material of Examples 5, 7 and 8 can be prepared by first converting the benzoic acid compound to 2-acetoxy-5-(4' - fluorophenyl)-benzoic acid and then converting the latter compound to the acid chloride. To make the acid chloride compound, hydroxy - 5 - (4'-fluorophenyl)-benzoic acid may be reacted with acetic anhydride in the presence of a catalyst such as sulfuric acid or pyridine at any suitable temperature (room temperature to elevated temperature) to form the corresponding 2-acetoxy benzoic acid compound and then reacting said latter compound with thionyl chloride at reflux until the evolution of hydrogen chloride ceases.

A detailed description of the preparation of 2-hydroxy-5-(4'-fluorophenyl)-benzoic acid is shown below:

4-(4'-fluorophenyl)-phenol

A solution of 32.66 grams of 4-(4'-fluorophenyl)-aniline in 120 ml. of glacial acetic acid is cooled to 10–20° C. To this solution is added slowly a solution of 12.25 grams of sodium nitrite in 120 ml. of water with stirring and continued cooling. Five minutes after this addition, the suspension of the diazonium acetate is added slowly to a boiling solution of 100 ml. of concentrated sulfuric acid and 200 ml. of water. After the final addition of the diazonium salt, the suspension is boiled for an additional 5 minutes and then allowed to cool to room temperature. The reaction mixture is then filtered and the cake dried in vacuo to yield 4-(4'-fluorophenyl)-phenol (M.P. 152–161° C., 24.07 grams).

2-hydroxy-5-(4'-fluorophenyl)-benzoic acid

A mixture of 10 grams of 4-(4'-fluorophenyl)-phenol and 27.2 grams of potassium carbonate is exposed to carbon dioxide at 1300 p.s.i. and 175° C. The dark mass obtained from this carbonation is then dissolved in 300 ml. of water and 200 ml. of methylene chloride and the two layers separated. The water layer is then extracted with 100 ml. of methylene chloride and then acidified with 2.5 normal hydrochloric acid. This mixture is then filtered and the cake dried in vacuo to yield 5.32 grams of the crude product. The crude product is then recrystallized from benzene-methanol to yield 2.7 grams of material (M.P. 200–204° C.). An additional crystallization of this semi-pure material from benzene-methanol yields analytically pure 2-hydroxy-5-(4'-fluorophenyl)-benzoic acid (M.P. 199–203° C.).

Following are detailed examples which show the preparation of the various compounds described in this invention. They are to be construed as illustrations of said compounds and not as limitations thereof.

EXAMPLE 1

2-benzoyloxy-5-(4'-fluorophenyl)-benzonitrile

A mixture of 6.0 g. of 2-hydroxy-5-(4'-fluorophenyl)-benzamide and 6.0 g. of benzo trichloride is heated at 115° C. for three hours. The crude reaction product is chromatographed on silica gel, and eluted with methylene chloride-methanol mixtures to obtain pure 2-benzoyloxy-5-(4'-fluorophenyl)-benzonitrile.

EXAMPLE 2

4-benzoyloxy-3-(5-tetrazolyl)-4'-fluorobiphenyl

A mixture of 1.3 g. of 2-benzoyloxy-5-(4'-fluorophenyl)-benzonitrile (obtained as in Example 1), 0.33 g. of sodium azide, 0.25 g. of ammonium chloride, and 8 ml. of N,N-dimethyl formamide is heated at 120° C. for 16 hours. The solvent is removed in vacuo, and the residue is taken up in ethyl acetate, washed with cold, dilute hydrochloric acid, and the product extracted into 0.5 N sodium hydroxide solution. Acidification causes the precipitation of 4-benzoyloxy-3-(5-tetrazolyl) - 4' - fluorobiphenyl, which is filtered, dried, and recrystallized from benzene/hexane mixtures.

EXAMPLE 3

4-hydroxy-3-[5-(2-hydroxy-1,3,4-oxadiazolyl)]-4'-fluorobiphenyl

A suspension prepared from 1.5 g. of finely ground 2-hydroxy-5-(4'-fluorophenyl)-benzhydrazide in 75 ml. of water, is cooled in an ice bath while a stream of phosgene gas is passed in for 0.5 hour. Stirring is continued for 1.0 hr. and the product is filtered. Chromatography on silica gel, and elution with methylene chloride-methanol mixtures yields pure 4-hydroxy-3-[5-(2-hydroxy-1,3,4-oxadiazolyl)]-4'-fluorobiphenyl.

EXAMPLE 4

Allyl-2-hydroxy-5-(4'-fluorophenyl)benzoate

A mixture of 0.01 mole of 2-hydroxy-5-(4'-hydroxy)-benzoic acid, 10 ml. of allyl alcohol, and 0.3 ml. of sulfuric acid is heated at 75° C. for 2 hours. The reaction mixture is cooled, diluted with 25 ml. of ether, and washed with dilute sodium bicarbonate solution. After drying with magnesium sulfate, the excess ether and allyl alcohol is removed by evaporation in vacuo to obtain allyl-2-hydroxy-5-(4'-fluorophenyl)benzoate.

EXAMPLE 5

Cyclohexyl-2-acetoxy-5-(4'-fluorophenyl)benzoate

To a solution of 1.0 g. of cyclohexanol in 3 ml. of pyridine at 0° C. is added slowly 1.0 g. of 2-acetoxy-5-(4'-fluorophenyl)-benzoyl chloride with shaking, and the mixture is kept at 0–5° C. for 20 hr. The mixture is poured into 25 ml. of ice water which is then extracted with cold 1 N sulfuric acid and with 1 N sodium bicarbonate solution. The ethereal solution is evaporated, and the residue chromatographed on a column of 50 g. of neutral alumina. Elution with mixtures of benzene and ethanol yields pure cyclohexyl-2-acetoxy-5-(4'-fluorophenyl)benzoate.

By using other cyclic alcohols such as cyclopentanol or cycloheptanol, the corresponding cycloalkoxy esters are obtained.

The method may also be applied to the synthesis of lower cycloalkoxy lower alkyl or lower cycloalkylamino lower alkyl esters by using, for example, β-cyclohexyloxy ethanol or β-cyclohexylamino ethanol as the alcohol component, and to the synthesis of poly lower alkoxy lower alkyl esters by using, for example, β,α-bis ethoxy propanol as the alcohol component.

EXAMPLE 6

2-hydroxy-5-(4'-fluorophenyl)-benzanilide

A mixture of 7 g. of 2-hydroxy-5-(4'-fluorophenyl)-benzoic acid and 3.5 g. of aniline in 20 ml. of chlorobenzene is heated to reflux and 850 mg. of phosphorous trichloride is added slowly. Heating at reflux is continued for 0.5 hr., and the solvent is then removed by steam distillation. After cooling, the aqueous suspension is filtered, and the solid is recrystallized from ethanol to obtain pure 2-hydroxy-5-(4'-fluorophenyl)-benzanilide.

By using a substituted aniline, i.e., p-chloroaniline, p-nitroaniline, or p-toluidine, instead of aniline in the above example, the corresponding substituted benzanilides are obtained.

EXAMPLE 7

[2-hydroxy-5-(4'-fluorophenyl)-benzoyl]-piperidine

A mixture of 3.0 g. of 2-acetoxy-5-(4'-fluorophenyl) benzoyl chloride, 50 ml. of benzene, and 1.8 g. of piperidine is stirred at 25° C. for six hours. The precipitated piperidine hydrochloride is removed by filtration, and the filtrate is freed of solvent by distillation. The residue is heated at reflux with 50 ml. of 1 N sodium hydroxide solution and 50 ml. of methanol for 0.25 hr. The methanol is removed by distillation, and the cooled mixture is neutralized with carbon dioxide. The crude product is collected by filtration and is recrystallized from benzene/hexane to yield pure [2-hydroxy-5-(4'-fluorophenyl)-benzoyl]-piperidine.

By using N-ethyl piperazine, pyrollidine, benzylamine, cyclohexylamine or dicyclohexylamine, the corresponding 2-hydroxy-5-(4'-fluorophenyl)-benzoyl derivatives of these amines are obtained.

EXAMPLE 8

Ethyl-6-O-[2'-acetoxy-5'-(4''-fluorophenyl)-benzoyl]-α-glucopyranoside

A mixture of 0.01 mole of 2-acetoxy-5-(4'-fluorophenyl)-benzoyl chloride, 0.013 mole of α-ethyl glucopyranoside and 50 ml. of pyridine is kept at 25° C. for 20 hours. The mixture is poured into 300 ml. of ice water and extracted with chloroform. The chloroform solution is washed with cold dilute hydrochloric acid and with dilute sodium bicarbonate solution, and dried with magnesium sulfate. Removal of the solvent by distillation furnishes ethyl - 6 - O - [2' - acetoxy - 5' - (4'' - fluorophenyl)-benzoyl]-α-glucopyranoside.

By using derivatives of other sugars or carbohydrates such as inositol, fructose, galactose, sorbitol, or sucrose instead of ethyl glucoside in the above example, the corresponding sugar esters are obtained.

EXAMPLE 9

2-(N-ethyl carbamoyloxy)-5-(p-fluorophenyl)-benzanilide

To a solution of 0.01 mole of N-[2-hydroxy-5-(4'-fluorophenyl)-benzoyl] aniline obtained as in Example 3, in 15 ml. of pyridine is added 0.025 mole of ethyl isocyanate in 4 ml. of benzene. After standing at 25° C. for 20 hours, 5 volumes of petroleum ether are added and the crude product filtered and washed. Recrystallization from benzene/hexane yields 2-(N-ethyl carbamoyloxy)-5-(p-fluorophenyl)-benzanilide. By using methyl isocyanate or butyl isocyanate instead of ethyl isocyanate in the above example, the corresponding N-methyl and N-butyl analogs are obtained.

EXAMPLE 10

2-trifluoroacetoxy-5-(4'-fluorophenyl)-benzoic acid

A solution of 3.0 g. of 2-hydroxy-5-(4'-fluorophenyl)-benzoic acid, 6 g. of trifluoroacetic anhydride, and 10 ml. of pyridine is warmed on the steam bath for 15 minutes. The reaction mixture is poured into 100 ml. of ice-water mixture, and the precipitated product is filtered. Recrystallization from benzene/hexane furnishes pure 2-trifluoroacetoxy-5-(4'-fluorophenyl)-benzoic acid.

By using anhydrides or acyl halides derived from other halo acids, such as chloroacetic acid or dichloroacetic acid, the corresponding haloacyloxy compounds are obtained.

EXAMPLE 11

2-(methoxy carbonyloxy)-5-(4'-fluorophenyl)-benzoic acid

A mixture of 0.01 mole of 2-hydroxy-5-(4'-fluorophenyl)-benzoic acid, 0.02 mole of diethylaniline, and 10 ml. of benzene is stirred at a temperature of 5–10° C., while methyl chlorocarbonate (0.01 mole) in 5 ml. of benzene is added gradually in approximately 1 hour. After stirring for 0.5 hr. more, the mixture is washed with 25 ml. of 2 N hydrochloric acid, and the benzene layer evaporated. The crude product is recrystallized from benzene/hexane mixture to obtain pure 2-(methoxycarbonoloxy)-5-(4'-fluorophenyl)-benzoic acid.

By using other alkyl or aralkyl chlorocarbonates in place of methyl chlorocarbonate in the above example, the corresponding substituted carbonate esters are obtained.

EXAMPLE 12

2-benzoyloxy-5-(4'-fluorophenyl)-benzoic acid

A mixture of 0.01 mole of 2-hydroxy-5-(4'-fluorophenyl)-benzoic acid in 20 ml. of ether and 2.5 ml. of pyridine is cooled to 5° C., and 0.01 mole of benzoyl chloride is added slowly with stirring. The mixture is stirred at 25° C. for 20 hours, and then poured into 50 ml. of ice-water mixture. The ether layer is separated, washed with dilute hydrochloric acid, and with dilute sodium bicarbonate solution. The bicarbonate solution is acidified, and the precipitated product is collected. The crude product is redissolved in very dilute sodium bicarbonate, and carefully precipitated by acidification. Recrystallization from benzene/hexane gives pure 2-benzoyloxy-5-(4'-fluorophenyl)-benzoic acid.

The above procedure may be applied to the preparation of other O-aroyl derivatives such as p-toluyl or p-chlorobenzoyl by using the appropriate aroyl halides.

The procedure, with suitable modification of temperature and time conditions, may also be applied to the acylation of the corresponding amides or esters derived from the hydroxy acid given in the above example. For example 2-hydroxy-5-(4'-fluorophenyl)-benzamide may be treated with benzoyl chloride to obtain 2-benzoyloxy-5-(4'-fluorophenyl)-benzamide.

EXAMPLE 13

2-(N,N-diethyl carboxamidomethoxy)-5-(4'-fluorophenyl)-benzoic acid

A mixture of 0.01 mole of methyl-2-hydroxy-5-(4'-fluorophenyl)-benzoate, 1.4 g. of anhydrous potassium acetate, 15 ml. of acetone, and 1.5 g. of α-chloro-N,N-diethylacetamide is heated at reflux for 20 hr. After cooling, the reaction mixture is filtered, and the filtrate evaported in vacuo. The crude product is chromatographed on a column of 150 g. of silica gel, which is eluted with mixtures of petroleum ether and ether, the proportion of the latter solvent being increased as the chromatography progresses. The desired intermediate, methyl-2-(N,N - diethylcarboxamidomethoxy)-5-(4'-fluorophenyl)-benzoate, is identified by its infra-red absorption spectrum. This compound is heated at reflux for 15 minutes with a mixture of 15 ml. of methanol and 15 ml. of 0.25 N sodium hydroxide solution. The methanol is distilled off, the aqueous solution is acidified, and the precipitated product is collected. Recrystallization from aqueous methanol yields pure 2-(N,N-diethyl carboxamidomethoxy)-5-(4'-fluorophenyl)-benzoic acid.

The above procedure may be applied to the synthesis of other 2-[α-(N,N-dialkylcarboxamidoalkyl) derivatives of the parent 2-hydroxy-5-(4'-fluorophenyl)-benzoic acid by using the appropriate α-halo loweracylamide.

EXAMPLE 14

2-(p-methoxyphenyl)-6-(p-fluorophenyl)-4-oxo-2,3-dihydrobenz-1,3-oxazine

A mixture of 0.1 mole of 2-hydroxy-5-(4'-fluorophenyl)-benzamide, 0.1 mole of anisaldehyde, 20 ml. of acetic acid, and 150 ml. of chloroform is heated at reflux for one hour, during which time a stream of hydrogen chloride gas is passed through the reaction mixture. The mixture is cooled, extracted with water, and with dilute sodium bicarbonate solution. After removal of solvent, the crude product is chromatographed on a column of 300 g. of silica gel. Elution with mixtures of benzene and acetone gives pure 2 - (p-methoxyphenyl)-6-(p-fluorophenyl)-4-oxo-2,3-dihydrobenz-1,3-oxazine.

The above procedure may be applied to the synthesis of other oxazine compounds by the use of the appropriate aldehyde. For example, by using β-chloropropionaldehyde instead of anisaldehyde in the above reaction, the corresponding 2-(β-chloroethyl)-6-(p-fluorophenyl)-4-oxo-2,3-dihydrobenz-1,3-oxazine is obtained.

EXAMPLE 15

2-benzoyloxy-5-(4'-fluorophenyl)-benzamide

To a solution of 5-(4'-fluorophenyl)salicylamide (0.1 mole) in 60 ml. of pyridine at −15° is added gradually 0.1 mole of benzoyl chloride with stirring. After keeping at 0° for 15 hours, the mixture is stirred with 500 ml. of ice-water and 200 ml. of chloroform. The chloroform phase is separated and washed with cold dilute hydrochloric acid until free of pyridine, and then with dilute sodium bicarbonate solution. The solution is dried with sodium sulfate, the solvent removed, and the crude product applied to a chromatography column containing 1 kg. of silica gel. Elution of the column with benzene-ether mixtures yields the desired product, 2-benzoyloxy-5-(4'-fluorophenyl)-benzamide.

EXAMPLE 16

6-(4'-fluorophenyl)-2-phenyl-1:3-benzoxazine-4-one

A solution of 5.0 g. of 2-benzoyloxy-5-(4'-fluorophenyl)-benzamide, as obtained in Example 15, in 50 ml. of anisole is heated to 150° C., and a slow stream of dry hydrogen chloride is passed into the mixture for three minutes. The anisole is then distilled off slowly, along with water formed in the reaction. The final small amount of anisole is removed by evaporation in vacuo. The crude product is then chromatographed on a column of neutral alumina which is eluted with benzene and with benzene containing increasing concentrations of ethanol. Recrystallization of the fractions containing the desired product from acetone/hexane mixtures yields pure 6-(4'-fluorophenyl)-2-phenyl-1:3-benzoxazine-4-one.

EXAMPLE 17

(A) [2-methoxycarbonyl-4-(4'-fluorophenyl)phenyl]-2''-acetamido-3'',4'',6''-tri-O-acetyl-2''-deoxyglucoside A mixture of 0.1 mole of 2-acetamido-3,4,6-tri-O-acetyl-2-deoxyglucosyl chloride, 0.12 mole of methyl-2-hydroxy-4-(4'-fluorophenyl)-benzoate, 1000 ml. of acetone, and 40 g. of anhydrous potassium carbonate is stirred at 25° for 48 hours. The inorganic salts are filtered off, and the solvent is removed by vacuum distillation. The residue is rubbed with ether to obtain the product.

(B) [2-methoxycarbonyl-4-(4'-fluorophenyl)phenyl]-2''-acetamido-2''-deoxyglucoside A solution of 0.1 mole of the product of Part A in 750 ml. of anhydrous methanol is warmed to 35°. A solution of 0.1 mole of sodium methoxide in 100 ml. of methanol is added, and the mixture is stirred at 35° for 1.0 hour. The mixture is evaporated in vacuo at a temperature below 25° to obtain the desired product.

(C) [2-carboxy-4-(4'-fluorophenyl)phenyl]-2''-acetamido-2''-deoxyglucoside

A suspension of 0.1 mole of the methyl ester obtained in Part B in 250 ml. of 50% aqueous methanol is stirred with 0.0103 mole of sodium hydroxide until dissolution of the ester is complete. Excess alkali is neutralized with carbon dioxide, and the solution is freeze-dried to obtain the sodium salt of the desired compound. The sodium salt may be converted to the free acid, [2-carboxy-4-(4'-fluorophenyl)phenyl]-2''-acetamido - 2'' - deoxyglucoside, by treating an aqueous solution of the salt with aqueous hydrochloric acid and filtering the precipitated free acid quickly, or by treating an aqueous solution of the salt with an excess of a cation exchange resin on the proton cycle, filtering off the resin, and concentrating the aqueous solution.

We claim:
1. A compound of the formula:

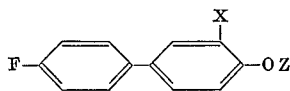

wherein X is

wherein

Y is phenyl amino,
  substituted phenyl amino,
    wherein the substituent is lower alkyl, lower alkoxy, anisidino, nitro or halo, di (hydroxy lower alkyl) amino, phenyl lower alkylamino, lower cycloalkylamino, di-lower cycloalkylamino, 1-(4-alkyl) piperazino, N-pyrrollidino and N-piperidino; and
Z is hydrogen.

2. A compound of claim 1 wherein X is

wherein Y is phenyl amino and Z is hydrogen, thus forming 2-hydroxy-5-(4'-fluorophenyl)-benzanilide.

References Cited
UNITED STATES PATENTS

| | | | |
|---|---|---|---|
| 2,926,176 | 2/1960 | Linn | 260—210 |
| 3,152,115 | 10/1964 | Morel et al. | 260—210 |
| 2,763,683 | 1956 | Beman et al. | 260—559 |
| 2,025,587 | 1935 | Haller et al. | 260—559 |

HENRY R. JILES, Primary Examiner

H. I. MOATZ, Assistant Examiner

U.S. Cl. X.R.

260—210, 247.7, 268, 294.1, 307, 308, 326.87, 461, 465, 473, 474, 476, 486, 521, 559, 564, 600, 620; 424—180, 230, 232, 233, 234, 235, 248, 272, 300, 301, 304, 308, 311, 321, 333